United States Patent
Takeuchi et al.

(10) Patent No.: US 12,242,565 B2
(45) Date of Patent: Mar. 4, 2025

(54) DEVICE ANALYSIS APPARATUS, DEVICE ANALYSIS METHOD, AND STORAGE MEDIUM

(71) Applicant: Mitsubishi Electric Corporation, Tokyo (JP)

(72) Inventors: Takeshi Takeuchi, Tokyo (JP); Tomoharu Takeuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 187 days.

(21) Appl. No.: 18/006,231

(22) PCT Filed: Sep. 3, 2020

(86) PCT No.: PCT/JP2020/033456
§ 371 (c)(1),
(2) Date: Jan. 20, 2023

(87) PCT Pub. No.: WO2022/049701
PCT Pub. Date: Mar. 10, 2022

(65) Prior Publication Data
US 2023/0297644 A1    Sep. 21, 2023

(51) Int. Cl.
*G06F 17/40* (2006.01)
*G01M 17/08* (2006.01)

(52) U.S. Cl.
CPC ............. *G06F 17/40* (2013.01); *G01M 17/08* (2013.01)

(58) Field of Classification Search
CPC ....... G06F 17/40; G01M 17/08; G05B 23/024
(Continued)

(56) References Cited

U.S. PATENT DOCUMENTS 8,930,146 B2    1/2015 Katsukura et al.
2012/0290879 A1    11/2012 Shibuya et al.
(Continued)

FOREIGN PATENT DOCUMENTS

CN    110398382 A    11/2019
CN    110530509 A    12/2019
(Continued)

OTHER PUBLICATIONS

International Search Report (PCT/ISA/210) with translation and Written Opinion (PCT/ISA/237) mailed on Nov. 24, 2020, by the Japan Patent Office as the International Searching Authority for International Application No. PCT/JP2020/033456. (9 pages).
(Continued)

*Primary Examiner* — Hai H Huynh
(74) *Attorney, Agent, or Firm* — BUCHANAN, INGERSOLL & ROONEY PC

(57) ABSTRACT

A device analysis apparatus includes: an operation data storage unit storing operation data indicating an operation state of a device; a feature quantity data generation unit generating feature quantity data of the device by using the operation data; a feature quantity data storage unit storing the feature quantity data; a first computation unit generating first data indicating behavior of the feature quantity data in units of a set term by using the feature quantity data stored in the feature quantity data storage unit; a second computation unit generating second data indicating behavior of latest feature quantity data by using one or more pieces of the latest feature quantity data newer than the feature quantity data used in generating the first data, among the feature quantity data stored in the feature quantity data storage unit; and a display unit displaying the first data and the second data in one graph.

17 Claims, 13 Drawing Sheets

(58) Field of Classification Search
USPC .................................................. 701/19, 20
See application file for complete search history.

(56) References Cited

U.S. PATENT DOCUMENTS

| | | |
|---|---|---|
| 2017/0316329 A1 | 11/2017 | Toyama |
| 2019/0121687 A1 | 4/2019 | Masuda et al. |
| 2021/0223765 A1 | 7/2021 | Nakabayashi et al. |
| 2021/0231535 A1 | 7/2021 | Nakamura |

FOREIGN PATENT DOCUMENTS

| | | | |
|---|---|---|---|
| JP | 2013205894 A | 10/2013 | |
| JP | 6689479 B1 | 4/2020 | |
| WO | 2009125627 A1 | 10/2009 | |
| WO | 2011024382 A1 | 3/2011 | |
| WO | 2016116961 A1 | 7/2016 | |
| WO | 2017134772 A1 | 8/2017 | |
| WO | 2018146714 A1 | 8/2018 | |
| WO | 2019230282 A1 | 12/2019 | |
| WO | 2020115827 A1 | 6/2020 | |

OTHER PUBLICATIONS

Notification of Reasons for Refusal dated Oct. 11, 2022 issued by the Japan Patent Office in Japanese Patent Application No. 2022-546800. (8 pages).

Office Action dated Oct. 17, 2023, issued in the corresponding Indian Patent Application No. 202327001866, 7 pages.

DEVICE ANALYSIS APPARATUS, DEVICE ANALYSIS METHOD, AND STORAGE MEDIUM

FIELD

The present disclosure relates to a device analysis apparatus, a device analysis method, and a storage medium for analyzing a state of a device.

BACKGROUND

Efforts have been widely made to collect and accumulate operation data from each device of a railway vehicle, and visualize and analyze a current state of a soundness degree of each device. As a method for visualizing and analyzing a state a soundness degree of each device, there is a method of analyzing a change in device soundness degree, that is, deterioration, for example, by cutting out feature quantity data in which the device soundness degree can be checked from time-series data, and performing difference comparison or the like with graph drawing on feature quantity data for a certain period, that is, for each term. Such a technique is disclosed in Patent Literature 1.

CITATION LIST

Patent Literature

Patent Literature 1: International Publication No. 2019/230282

SUMMARY

Technical Problem

However, according to the above-described conventional technique, for example, when it is desired to cut out a change in operation data for several seconds at a time of departure from a station as a feature quantity data and compare the feature quantity data for each month, feature quantity data for each term, that is, for each month becomes an enormous number of samples. Therefore, there has been a problem in that a processing load at a time of graph drawing increases. In addition, there has been a problem in that data comparison cannot be easily performed when the number of samples is enormous.

The present disclosure has been made in view of the above, and an object is to obtain a device analysis apparatus capable of performing visualization to allow data to be easily compared, while preventing an increase in processing load in visualizing a state of a device.

Solution to Problem

In order to solve the above problem and achieve the object, a device analysis apparatus in the present disclosure includes: an operation data storage unit to store operation data indicating an operation state of a device installed on a railway vehicle; a feature quantity data generation unit to generate feature quantity data of the device by using the operation data; a feature quantity data storage unit to store the feature quantity data; a first computation unit to generate first data indicating behavior of the feature quantity data in units of a term that is set, by using the feature quantity data stored in the feature quantity data storage unit; a second computation unit to generate second data indicating behavior of latest feature quantity data by using one or more pieces of the latest feature quantity data newer than the feature quantity data used in generating the first data by the first computation unit, among the feature quantity data stored in the feature quantity data storage unit; and a display unit to display one or more pieces of the first data and the second data in one graph.

Advantageous Effects of Invention

According to the present disclosure, there is an effect that the device analysis apparatus can perform visualization to allow data to be easily compared, while preventing an increase in processing load in visualizing a state of a device.

DESCRIPTION OF EMBODIMENTS

Hereinafter, a device analysis apparatus, a device analysis method, and a storage medium according to embodiments of the present disclosure will be described in detail with reference to the drawings.

First Embodiment

Figure 1:
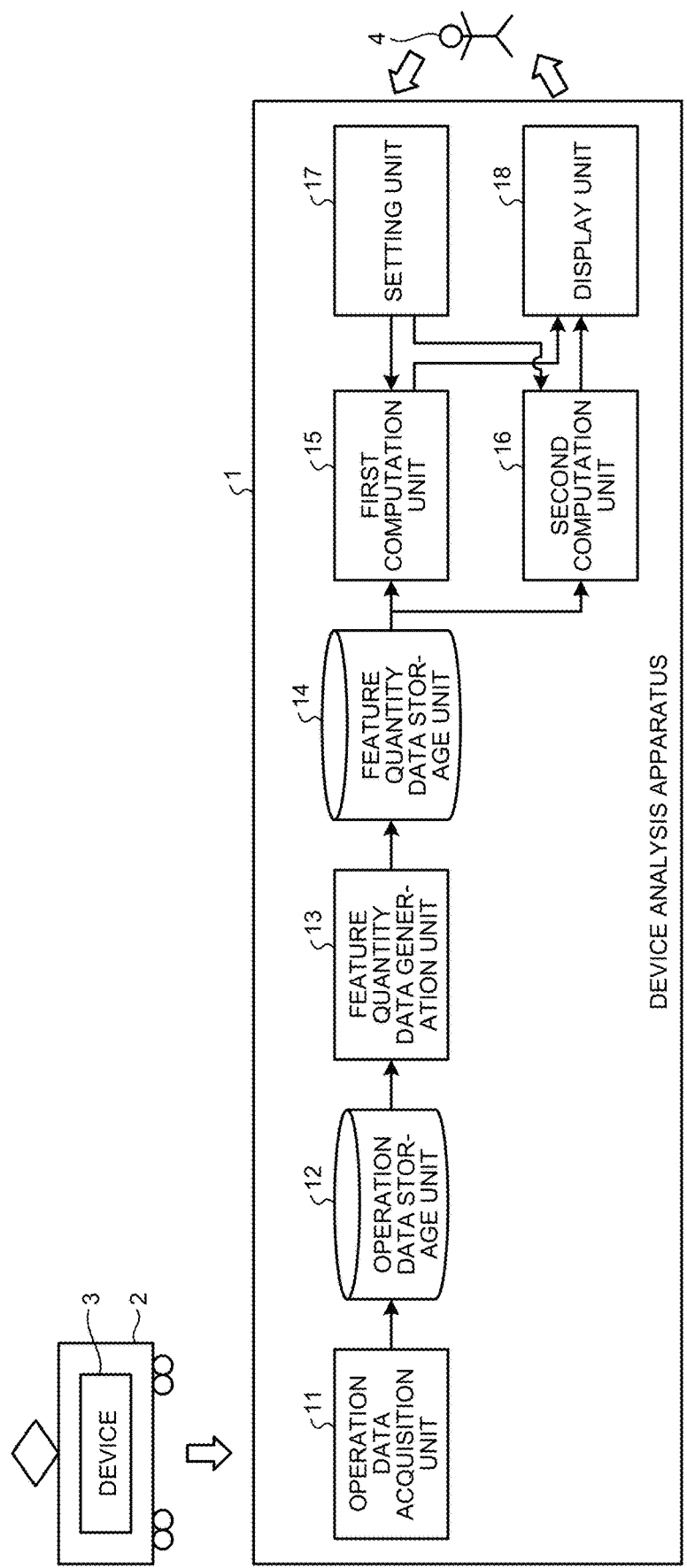
FIG. 1 is a diagram illustrating an exemplary configuration of a device analysis apparatus according to a first embodiment.
Figure 2:
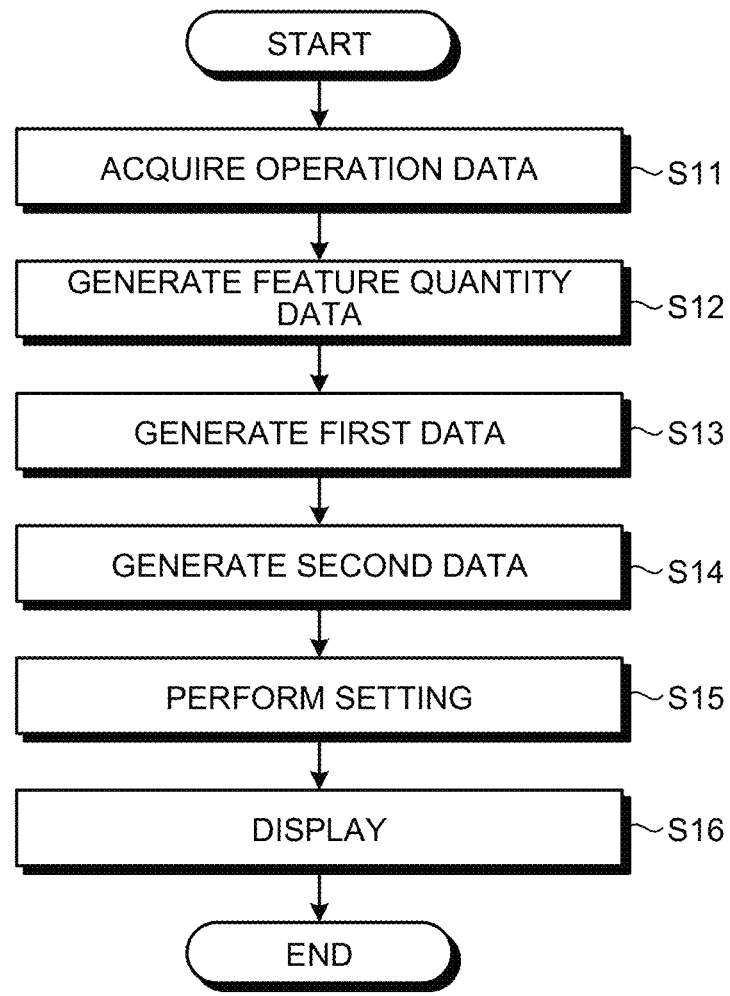
FIG. 2 is a flowchart illustrating an operation of the device analysis apparatus according to the first embodiment.

FIG. 1 is a diagram illustrating an exemplary configuration of a device analysis apparatus 1 according to a first embodiment. In the example of FIG. 1, the device analysis apparatus 1 analyzes a state of a device 3 installed on a railway vehicle 2. Note that application of the device analysis apparatus 1 is not limited to the device 3 installed on the railway vehicle 2. A configuration and an operation of the device analysis apparatus 1 will be described in detail. The device analysis apparatus 1 includes an operation data acquisition unit 11, an operation data storage unit 12, a feature quantity data generation unit 13, a feature quantity data storage unit 14, a first computation unit 15, a second computation unit 16, a setting unit 17, and a display unit 18. FIG. 2 is a flowchart illustrating an operation of the device analysis apparatus 1 according to the first embodiment.

The operation data acquisition unit 11 acquires, from the railway vehicle 2, operation data indicating an operation state of the device 3 installed on the railway vehicle 2 (step S11). In the example of FIG. 1, one device 3 is installed on the railway vehicle 2, but in practice, it is assumed that a plurality of the devices 3 are installed on the railway vehicle 2. In a case where a train including a plurality of the railway vehicles 2 are targeted, the operation data acquisition unit 11 acquires operation data from each railway vehicle 2. The operation data acquisition unit 11 may acquire operation data for a plurality of trains, from a plurality of the railway vehicles 2 constituting each train. The device 3 installed on the railway vehicle 2 is, for example, an air conditioner, a motor, or the like, but is not limited thereto. The operation data is, for example, a difference between a set temperature and an actual temperature, an operation mode, and the like when the device 3 is an air conditioner, and is an applied voltage of a motor, a current flowing through the motor, and the like when the device 3 is a motor. The operation data may be a measurement value measured by a sensor (not illustrated) installed on the railway vehicle 2, operation data by a driver (not illustrated) of the railway vehicle 2, or the like. As a method for acquiring the operation data, the operation data acquisition unit 11 may acquire the operation data from the railway vehicle 2 by using wireless communication, by using wired communication, or via a storage medium or the like. Further, as for a timing of acquiring the operation data, the operation data acquisition unit 11 may acquire the operation data for one day after daily operation of the target railway vehicle 2 ends, or may sequentially acquire the operation data in a case where wireless communication is used. The operation data acquisition unit 11 causes the operation data storage unit 12 to store the operation data acquired from the railway vehicle 2. The operation data storage unit 12 stores the operation data acquired by the operation data acquisition unit 11.

The feature quantity data generation unit 13 generates feature quantity data of the device 3 installed on the railway vehicle 2, by using time-series operation data stored in the operation data storage unit 12 (step S12). For example, when the operation data is acquired every day by the operation data acquisition unit 11, the feature quantity data generation unit 13 generates the feature quantity data of the target device 3 once a day by using the added operation data. In a case where there are a plurality of target devices 3, the feature quantity data generation unit 13 generates the feature quantity data for each device 3. A method of generating the feature quantity data in the feature quantity data generation unit 13 is not particularly limited, and may be a conventional general method. The feature quantity data generation unit 13 causes the feature quantity data storage unit 14 to store the generated feature quantity data. The feature quantity data storage unit 14 stores the feature quantity data generated by the feature quantity data generation unit 13.

The first computation unit 15 generates first data indicating behavior of the feature quantity data in units of a set term, by using the feature quantity data stored in the feature quantity data storage unit 14 (step S13). The set term is set by default in the first computation unit 15 or set by a user 4 via the setting unit 17. The term may be in units of years, months, weeks, or days. In addition, the term may be a period different depending on a type of the device 3. Here, the first computation unit 15 generates the first data indicating a past state of the device 3 by using feature quantity data of a multiple of the set term among the feature quantity data stored in the feature quantity data storage unit 14. For example, in a case where the unit of the term set for a certain device 3 is one month, a start date of the term is the first day of each month, and an end date is the end of the month, the first computation unit 15 generates the first data indicating a past state of the device 3 by using feature quantity data from the first day to the end of each month. Note that, in a case where the unit of the term is one month and the first data has been generated for a certain month, the first computation unit 15 does not need to generate the first data for the certain month again. For example, in the next month, the first computation unit 15 may simply generate the first data for the previous month once by using the feature quantity data for the previous month. The first computation unit 15 stores one or more pieces of the generated first data.

The second computation unit 16 generates second data indicating behavior of latest feature quantity data, by using one or more pieces of the latest feature quantity data newer than the feature quantity data used in generating the first data by the first computation unit 15, among the feature quantity data stored in the feature quantity data storage unit 14 (step S14). For example, if the unit of the term set for a certain device 3 is one month, a start date of the term is the first day of each month, and an end date of the term is the end of the month as described above, the second computation unit 16 generates the second data by using feature quantity data from the first day to the 15th day of the month when the current day is the 15th day of the month. The number of pieces of feature quantity data used by the second computation unit 16 is less than the set term. As described above, the second computation unit 16 generates the second data by using the latest feature quantity data that is not used by the first computation unit 15 because the set term is not reached.

The setting unit 17 receives an operation from the user 4, and sets the unit of the term, the start date of the term, the end date of the term, and the like described above for the first computation unit 15 and the second computation unit 16 (step S15). As described above, the term may be in units of years, months, weeks, or days. In addition, the term may be a period different depending on a type of the device 3. The start date of the term is, for example, ○ month ○ day ○○ hour ○○ minute every year when the unit of the term is one year, and ○ day ○○ hour ○○ minute every week when the unit of the term is one week. The end date of the term is, for example, × month × day ×× hour ×× minute every year when the unit of the term is one year, and is × day ×× hour ×× minute every week when the unit of the term is one week. The user 4 may appropriately change the unit of the term, the start date of the term, the end date of the term, and the like via the setting unit 17 in a case where there is a point of interest in the first data and the second data displayed on the display unit 18 to be described later. That is, when the user 4 sets the unit of the term, the start date of the term, the end date of the term, and the like via the setting unit 17, the user 4 may perform the setting in advance before the start of the operation of the device analysis apparatus 1 before step S11 of the flowchart illustrated in FIG. 2, or may perform the setting after step S15. Note that the device analysis apparatus 1 may be configured not to include the setting unit 17 when the term or the like set by default in the first computation unit 15 and the second computation unit 16 is used and the setting of the term is not changed.

The display unit 18 superimposes and displays one or more pieces of the first data generated by the first computation unit 15 and one piece of the second data generated by the second computation unit 16 in one graph, for example (step S16). The first data indicates a past state summarized in units of a set term for a certain device 3. The second data indicates a latest state of the certain device 3. As a result, the user 4 who has checked a display content of the display unit 18 can determine that there is no change in the state of the device 3 when the second data indicates a similar feature to the first data, and determine that a change has occurred in the state of the device 3, that is, there is a possibility of deterioration when the second data has been changed with respect to the first data. The user 4 may check original data, that is, operation data of each device 3 stored in the operation data storage unit 12 as necessary on the basis of the display content of the display unit 18.

When acquiring operation data from the railway vehicle 2 periodically, for example, every day, the device analysis apparatus 1 may simply perform the operation by using newly acquired operation data, that is, operation data of a difference from the previous day. Note that the first computation unit 15 generates the first data for the latest term after the feature quantity data for the set term is obtained, that is, for each set term.

In the device analysis apparatus 1, in a case where the operation data acquisition unit 11 acquires operation data of only a specific device 3 installed on the railway vehicle 2, the first computation unit 15 generates the first data for the specific device 3 installed on the railway vehicle 2, and the second computation unit 16 generates the second data for the specific device 3 installed on the railway vehicle 2. Further, in the device analysis apparatus 1, in a case where the operation data acquisition unit 11 acquires operation data of a plurality of devices 3 of an identical type installed on a specific railway vehicle 2, the first computation unit 15 generates the first data for the plurality of devices 3 of the identical type installed on the specific railway vehicle 2, and the second computation unit 16 generates the second data for the plurality of devices 3 of the identical type installed on the specific railway vehicle 2. In addition, in the device analysis apparatus 1, in a case where the operation data acquisition unit 11 acquires the operation data of a plurality of the devices 3 of an identical type installed on different railway vehicles 2, the first computation unit 15 generates the first data for the plurality of devices 3 of the identical type installed on the different railway vehicles 2, and the second computation unit 16 generates the second data for the plurality of devices 3 of the identical type installed on the different railway vehicles 2.

Next, a hardware configuration of the device analysis apparatus 1 will be described. In the device analysis apparatus 1, the operation data acquisition unit 11 is an interface such as a communication device. The operation data storage unit 12 and the feature quantity data storage unit 14 are memories. The setting unit 17 is an operation device such as a mouse or a keyboard. In the display unit 18, a portion that displays a display content is a monitor such as a liquid crystal display (LCD). In the feature quantity data generation unit 13, the first computation unit 15, the second computation unit 16, and the display unit 18, a portion that generates a display content is implemented by processing circuitry. The processing circuitry may be a memory and a processor that executes a program stored in the memory, or may be dedicated hardware.

Figure 3:
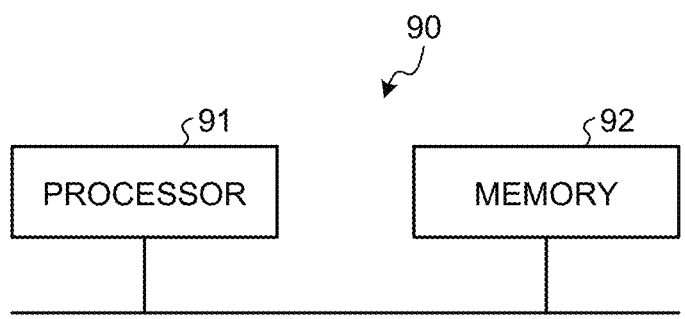
FIG. 3 is a diagram illustrating an example of a case where processing circuitry included in the device analysis apparatus according to the first embodiment is configured with a processor and a memory.

FIG. 3 is a diagram illustrating an example of a case where processing circuitry 90 included in the device analysis apparatus 1 according to the first embodiment is configured with a processor 91 and a memory 92. In a case where the processing circuitry 90 is configured with the processor 91 and the memory 92, each function of the processing circuitry of the device analysis apparatus 1 is implemented by software, firmware, or a combination of software and firmware. The software or the firmware is described as a program and stored in the memory 92. In the processing circuitry 90, the processor 91 reads and executes the program stored in the memory 92 to implement each function. That is, the processing circuitry 90 includes the memory 92 for storing a program that results in execution of processing of the device analysis apparatus 1. Further, it can also be said that these programs cause a computer to execute a procedure and a method of the device analysis apparatus 1.

Here, the processor 91 may be a central processing unit (CPU), a processing device, an arithmetic device, a microprocessor, a microcomputer, a digital signal processor (DSP), or the like. Further, the memory 92 corresponds to a nonvolatile or volatile semiconductor memory such as a random access memory (RAM), a read only memory (ROM), a flash memory, an erasable programmable ROM (EPROM), or an electrically EPROM (EEPROM, registered trademark), a magnetic disk, a flexible disk, an optical disk, a compact disk, a mini disk, a digital versatile disc (DVD), or the like.

Figure 4:
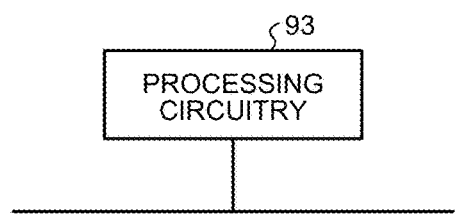
FIG. 4 is a diagram illustrating an example of a case where processing circuitry included in the device analysis apparatus according to the first embodiment is configured with dedicated hardware.

FIG. 4 is a diagram illustrating an example of a case where processing circuitry 93 included in the device analysis apparatus 1 according to the first embodiment is configured with dedicated hardware. In a case where the processing circuitry 93 is configured with dedicated hardware, the processing circuitry 93 illustrated in FIG. 4 corresponds to, for example, a single circuit, a composite circuit, a programmed processor, a parallel-programmed processor, an application specific integrated circuit (ASIC), a field programmable gate array (FPGA), or a combination thereof. Individual functions of the device analysis apparatus 1 may be implemented by the processing circuitry 93 for each of the functions, or the individual functions may be collectively implemented by the processing circuitry 93.

Note that some of the functions of the device analysis apparatus 1 may be implemented by dedicated hardware, and some of the functions may be implemented by software or firmware. In this manner, the processing circuitry can implement each of the above-described functions by dedicated hardware, software, firmware, or a combination thereof.

As described above, according to the present embodiment, the device analysis apparatus 1 generates feature quantity data by using operation data of the device 3 installed on the railway vehicle 2, generates first data indicating a past state of the device 3 and second data indicating a current state of the device 3 from the feature quantity data, and superimposes and displays the first data and the second data in one graph. As a result, the device analysis apparatus 1 can perform visualization to allow data to be easily compared, while preventing an increase in processing load in visualizing a state of the device 3. The user 4 who has checked the display of the device analysis apparatus 1 can easily determine whether or not a change has occurred in the state of the device 3.

Second Embodiment

In a second embodiment, a case will be described in which band line information is generated as operations of the first computation unit 15 and the second computation unit 16 included in the device analysis apparatus 1.

Figure 5:
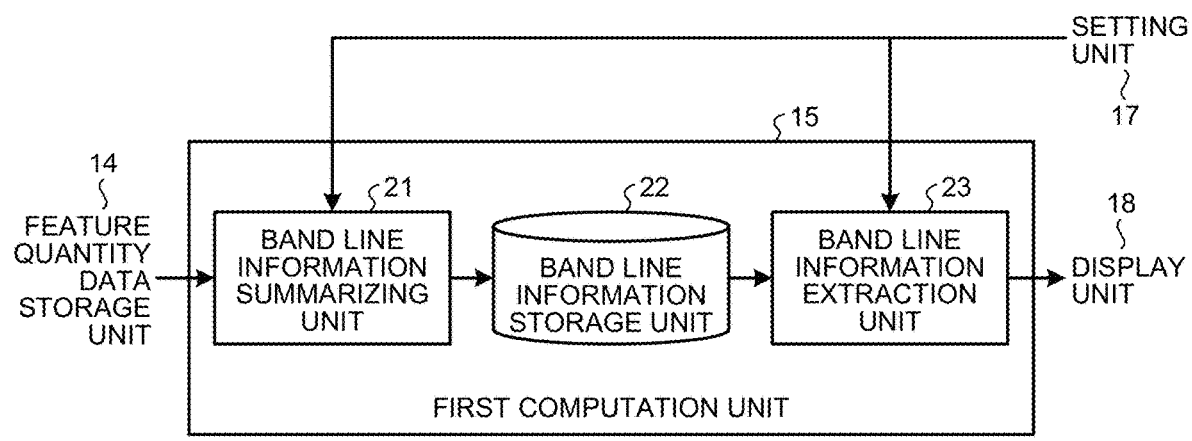
FIG. 5 is a diagram illustrating an exemplary configuration of a first computation unit of a device analysis apparatus according to a second embodiment.
Figure 6:
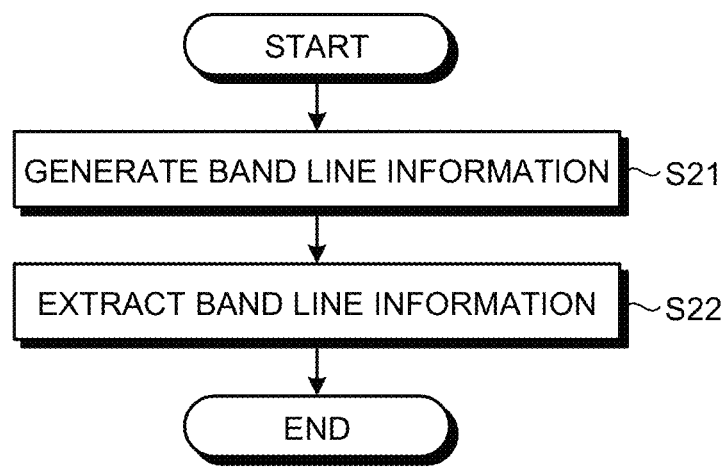
FIG. 6 is a flowchart illustrating an operation of the first computation unit of the device analysis apparatus according to the second embodiment.

First, a detailed configuration and operation of the first computation unit 15 will be described. FIG. 5 is a diagram illustrating an exemplary configuration of the first computation unit 15 of the device analysis apparatus 1 according to the second embodiment. The first computation unit 15 includes a band line information summarizing unit 21, a band line information storage unit 22, and a band line information extraction unit 23. FIG. 6 is a flowchart illustrating an operation of the first computation unit 15 of the device analysis apparatus 1 according to the second embodiment. The flowchart illustrated in FIG. 6 illustrates details of the operation in step S13 of the flowchart of the first embodiment illustrated in FIG. 2.

The band line information summarizing unit 21 generates, as the first data, band line information obtained by summarizing feature quantity data in units of a term, by using the feature quantity data stored in the feature quantity data storage unit 14 (step S21). For example, in a case where the unit of the term is one month as described above, the band line information summarizing unit 21 generates one piece of band line information obtained by summarizing the feature quantity data on a monthly basis. The term may be set by default or may be set by the user 4 via the setting unit 17. Note that, in a case where the unit of the term is one month and the band line information has been generated for a certain month, the band line information summarizing unit 21 does not need to generate the band line information of the certain month again. For example, in the next month, the band line information summarizing unit 21 may simply generate band line information of the previous month by using feature quantity data of the previous month. The band line information summarizing unit 21 causes the band line information storage unit 22 to store the generated one or more pieces of band line information. The band line information storage unit 22 stores the one or more pieces of the band line information generated by the band line information summarizing unit 21.

The band line information extraction unit 23 extracts the band line information for a term included in a designated period, from the band line information storage unit 22 (step S22). Even when the band line information for seven months or more is stored in the band line information storage unit 22, the band line information extraction unit 23 extracts the band line information for latest six months from the band line information storage unit 22 when the designated period is the latest six months. The designated period may be past ○○ days, or a period with a start date designated. In addition, the designated period may be set by default or may be set by the user 4 via the setting unit 17.

Figure 7:
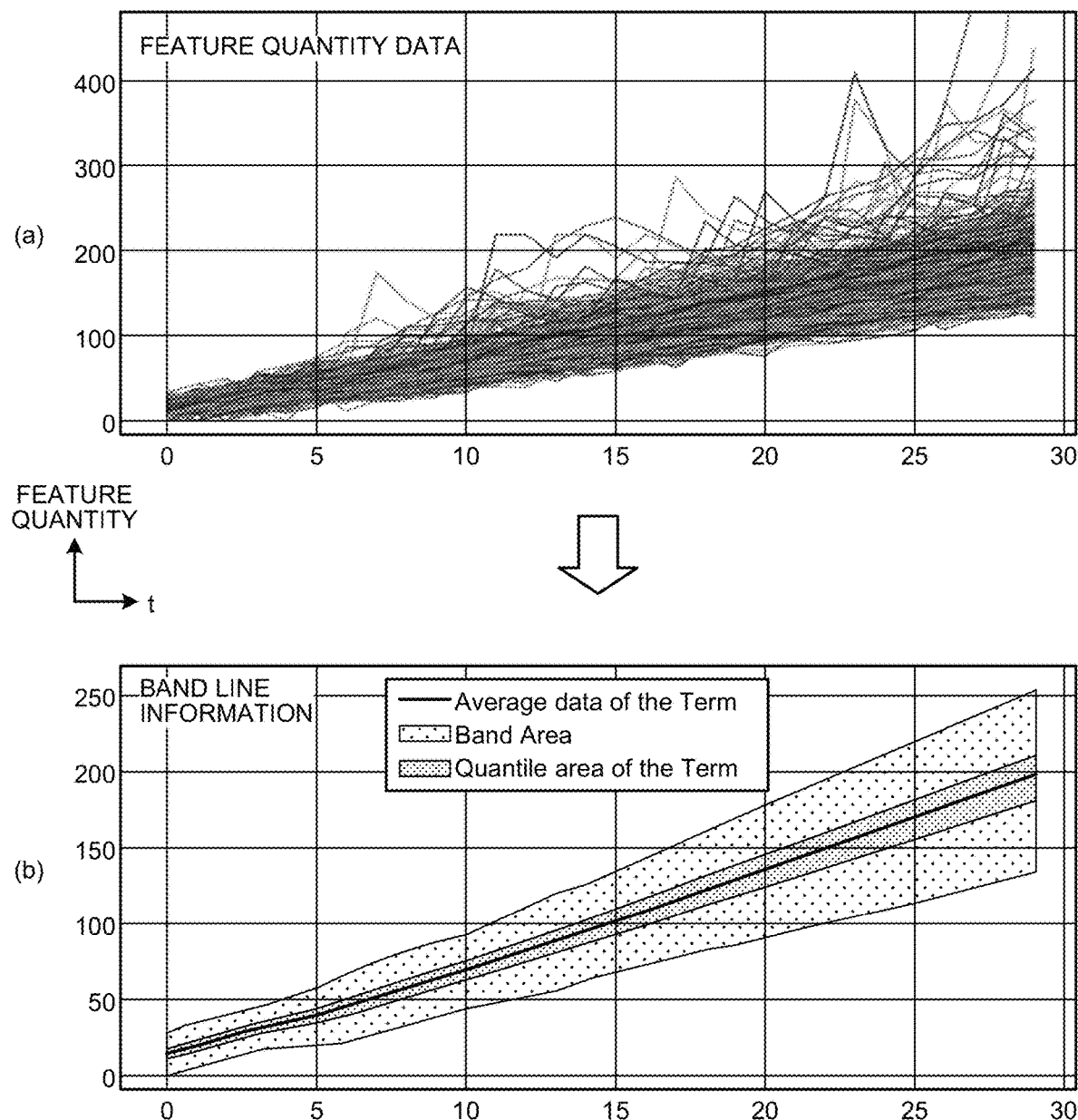
FIG. 7 is a graph illustrating an example of band line information generated by a band line information summarizing unit of the device analysis apparatus according to the second embodiment.

Here, the band line information generated by the band line information summarizing unit 21 will be described. FIG. 7 is a graph illustrating an example of the band line information generated by the band line information summarizing unit 21 of the device analysis apparatus 1 according to the second embodiment. In FIG. 7, (a) illustrates feature quantity data that is a source of the band line information, and (b) illustrates band line information generated by the band line information summarizing unit 21 using the feature quantity data illustrated in (a). In (a) and (b) in FIG. 7, a horizontal axis represents time, and a vertical axis represents magnitude of a feature quantity. As illustrated in (a) in FIG. 7, when the number of pieces of feature quantity data increases, a processing load when the device analysis apparatus 1 displays each piece of feature quantity data increases. Therefore, the band line information summarizing unit 21 summarizes the feature quantity data into the band line information in units of a set term. As a result, the device analysis apparatus 1 can prevent an increase in processing load at a time of display, by displaying the summarized band line information.

The band line information summarizing unit 21 may generate band line information including a plurality of display patterns on the basis of a quantile obtained from the number of pieces of feature quantity data included in the band line information generated in units of a term. For example, in a case of summarizing feature quantity data including time-series data of 30 points, the band line information summarizing unit 21 generates the band line information on the basis of quantile information of each point, that is, the first to 30th points, of the feature quantity data. For example, in a case of generating information summary of feature quantity data of one term with two of a dark color band and a light color band, the band line information summarizing unit 21 indicates from the first quartile to the third quartile as a quartile area with the dark color band, and indicates from (the first quartile−the quartile area×1.5) to (the third quartile+the quartile area×1.5) as a data distribution area with the light color band. As a result, the user 4 who has checked the band line information as illustrated in FIG. 7(b) on the display unit 18 can easily grasp a variation state of the feature quantity data.

Figure 8:
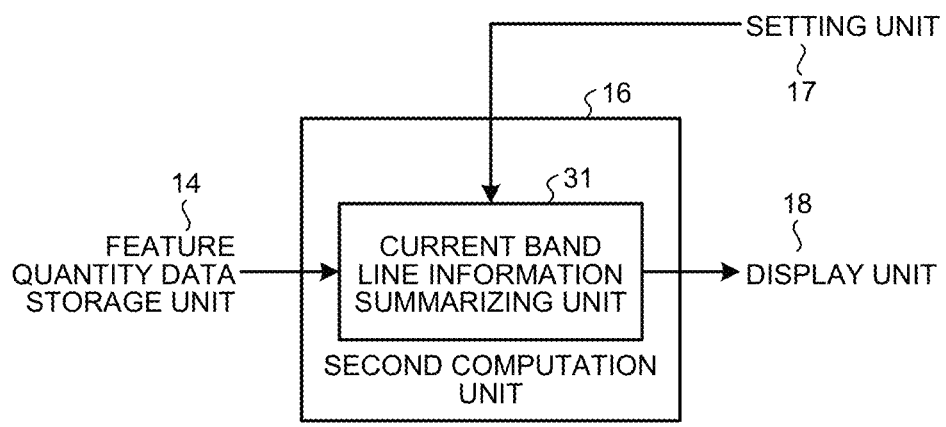
FIG. 8 is a diagram illustrating an exemplary configuration of a second computation unit of the device analysis apparatus according to the second embodiment.
Figure 9:
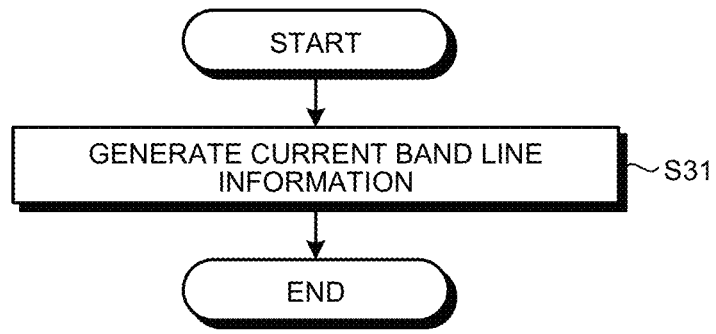
FIG. 9 is a flowchart illustrating an operation of the second computation unit of the device analysis apparatus according to the second embodiment.

Next, a detailed configuration and operation of the second computation unit 16 will be described. FIG. 8 is a diagram illustrating an exemplary configuration of the second computation unit 16 of the device analysis apparatus 1 according to the second embodiment. The second computation unit 16 includes a current band line information summarizing unit 31. FIG. 9 is a flowchart illustrating an operation of the second computation unit 16 of the device analysis apparatus 1 according to the second embodiment. The flowchart illustrated in FIG. 9 illustrates details of the operation in step S14 of the flowchart of the first embodiment illustrated in FIG. 2.

The current band line information summarizing unit 31 generates, as the second data, current band line information obtained by summarizing latest feature quantity data, by using one or more pieces of the latest feature quantity data newer than feature quantity data used in generating band line information by the first computation unit 15 (step S31). The number of pieces of feature quantity data used by the current band line information summarizing unit 31 is less than the set term. As described above, the current band line information summarizing unit 31 generates the current band line information by using the latest feature quantity data that is not used by the band line information summarizing unit 21 because the set term is not reached. A method of generating the current band line information in the current band line information summarizing unit 31 is similar to the method of generating the band line information in the band line information summarizing unit 21 described above.

Figure 10:
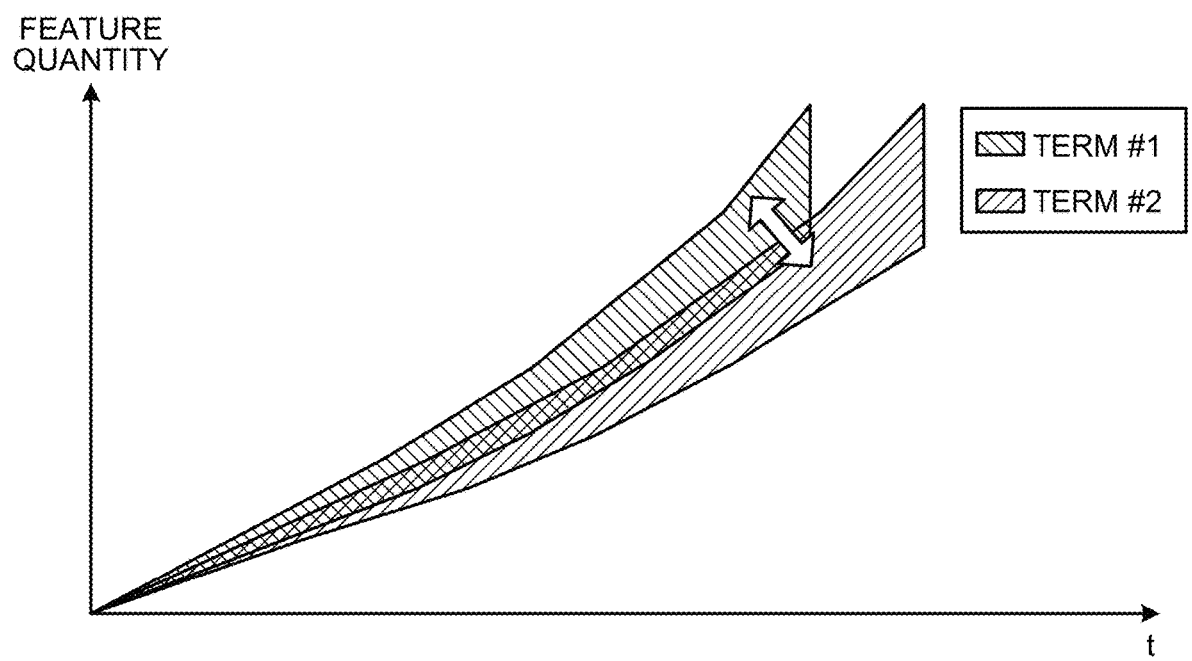
FIG. 10 is a graph illustrating an example of band line information and current band line information displayed by a display unit of the device analysis apparatus according to the second embodiment.

After the band line information is generated by the first computation unit 15 and the current band line information is generated by the second computation unit 16, the display unit 18 displays, in one graph, one or more pieces of the band line information extracted by the band line information extraction unit 23 and the current band line information generated by the current band line information summarizing unit 31. That is, the display unit 18 superimposes one or more pieces of the band line information and the current band line information to be plotted on a graph. FIG. 10 is a graph illustrating an example of the band line information and the current band line information displayed by the display unit 18 of the device analysis apparatus 1 according to the second embodiment. In FIG. 10, a horizontal axis represents time, and a vertical axis represents magnitude of a feature quantity. In the example of FIG. 10, the band line information generated by the first computation unit 15 is indicated by "term #1", and the current band line information generated by the second computation unit 16 is indicated by "term #2". For example, the user 4 checks how much the current band line information has shifted from the band line information displayed on the display unit 18, how much a shape of the current band line information has changed, and the like. As a result, the user 4 can grasp what kind of state the latest state of a certain device 3 is. Note that, in the example of FIG. 10, a case is illustrated in which the number of pieces of the band line information generated by the first computation unit 15 is one, but the present disclosure is not limited thereto. The display unit 18 can simultaneously display a plurality of pieces of the band line information generated by the first computation unit 15 and one piece of the current band line information generated by the second computation unit 16.

In the second embodiment, the device analysis apparatus 1 periodically executes the operations up to the band line information summarizing unit 21 offline, and executes the operations in and after the band line information extraction unit 23 and the current band line information summarizing unit 31 online by an operation from the user 4.

As described above, according to the present embodiment, the device analysis apparatus 1 generates feature quantity data by using operation data of the device 3 installed on the railway vehicle 2, generates band line information as first data indicating a past state of the device 3 and current band line information as second data indicating a current state of the device 3 from the feature quantity data, and superimposes and displays the band line information and the current band line information in one graph. In this case, similarly to the first embodiment, the device analysis apparatus 1 can perform visualization to allow data to be easily compared, while preventing an increase in processing load in visualizing a state of the device 3. The user 4 who has checked the display of the device analysis apparatus 1 can easily determine whether or not a change has occurred in the state of the device 3.

Third Embodiment

In a third embodiment, a case will be described in which band line information is generated as operations of the first computation unit 15 and the second computation unit 16 included in the device analysis apparatus 1.

Figure 11:
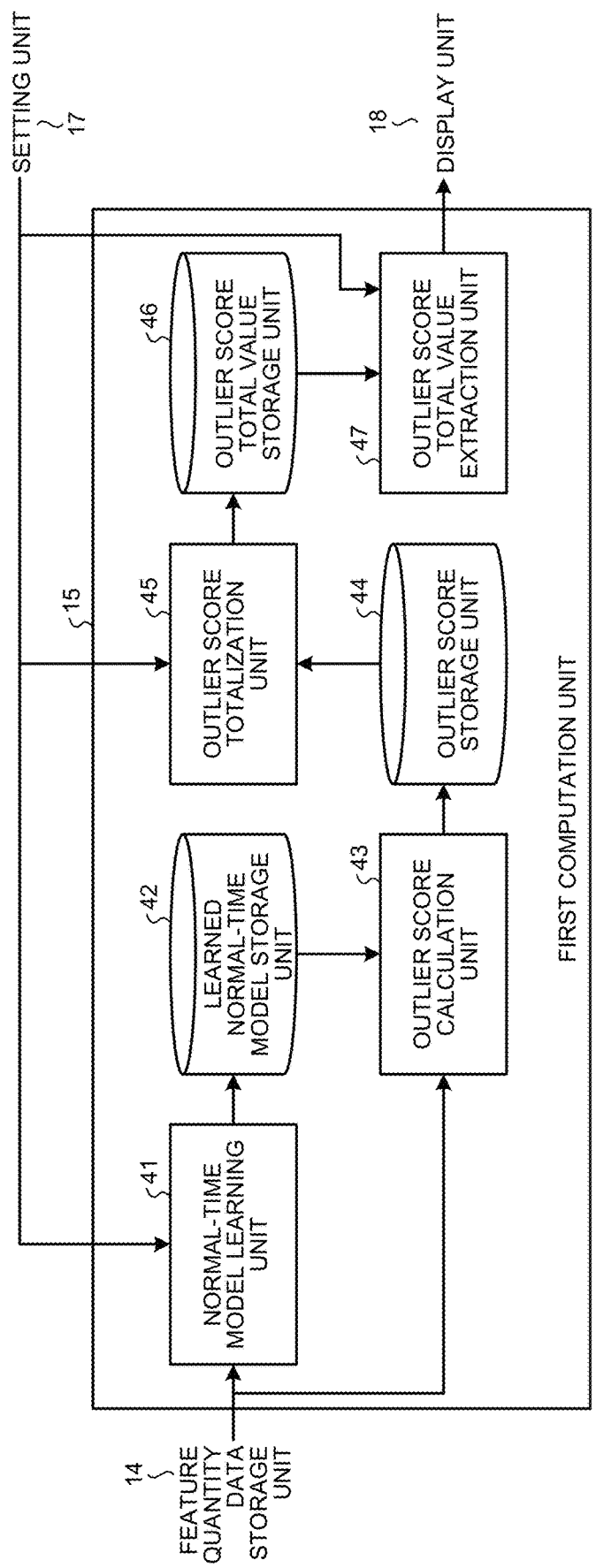
FIG. 11 is a diagram illustrating an exemplary configuration of a first computation unit of a device analysis apparatus according to a third embodiment.
Figure 12:
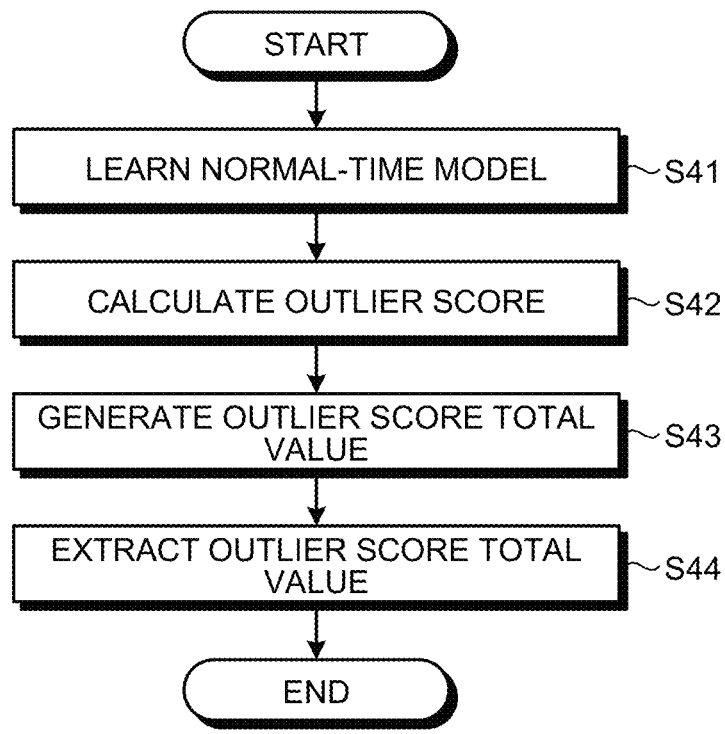
FIG. 12 is a flowchart illustrating an operation of the first computation unit of the device analysis apparatus according to the third embodiment.

First, a detailed configuration and operation of the first computation unit 15 will be described. FIG. 11 is a diagram illustrating an exemplary configuration of the first computation unit 15 of the device analysis apparatus 1 according to the third embodiment. The first computation unit 15 includes a normal-time model learning unit 41, a learned normal-time model storage unit 42, an outlier score calculation unit 43, an outlier score storage unit 44, an outlier score totalization unit 45, an outlier score total value storage unit 46, and an outlier score total value extraction unit 47. FIG. 12 is a flowchart illustrating an operation of the first computation unit 15 of the device analysis apparatus 1 according to the third embodiment. The flowchart illustrated in FIG. 12 illustrates details of the operation in step S13 of the flowchart of the first embodiment illustrated in FIG. 2.

The normal-time model learning unit 41 learns a normal-time model representing a state of the device 3 in a normal time by using feature quantity data in a defined period as feature quantity data in the normal time of the device 3, among the feature quantity data stored in the feature quantity data storage unit 14 (step S41). For example, the normal-time model learning unit 41 uses feature quantity data in a period that is set, that is, defined by the setting unit 17, as the feature quantity data in a normal time of the device 3, and learns a normal-time model by artificial intelligence (AI) learning or the like. A method of AI learning in the normal-time model learning unit 41 may be a conventional general method, and is not particularly limited. Note that the normal-time model learning unit 41 may learn the normal-time model by a method other than AI learning. The normal-time model learning unit 41 causes the learned normal-time model storage unit 42 to store the learned normal-time model obtained as a result of learning. The learned normal-time model storage unit 42 stores the learned normal-time model learned by the normal-time model learning unit 41.

The outlier score calculation unit 43 uses the learned normal-time model stored in the learned normal-time model storage unit 42, to calculate an outlier score indicating a degree of deviation from a state of the device 3 in the normal time with respect to the feature quantity data stored in the feature quantity data storage unit 14 (step S42). The outlier score calculation unit 43 causes the outlier score storage unit 44 to store the calculated outlier score. The outlier score storage unit 44 stores the outlier score calculated by the outlier score calculation unit 43.

The outlier score totalization unit 45 totalizes the outlier scores stored in the outlier score storage unit 44 in units of a term included in a designated period, to generate an outlier score total value (step S43). The outlier score totalization unit 45 calculates, for example, an average value, a standard deviation, or the like of the outlier scores in units of the term as the outlier score total value. Note that, in a case where the unit of the term is one month and the outlier score total value has been generated for a certain month, the outlier score totalization unit 45 does not need to generate the outlier score total value for the certain month again. For example, in the next month, the outlier score totalization unit 45 may simply generate an outlier score total value of the previous month by using an outlier score of the previous month. The outlier score totalization unit 45 causes the outlier score total value storage unit 46 to store the generated one or more outlier score total values. The outlier score total value storage unit 46 stores one or more of the outlier score total values generated by the outlier score totalization unit 45.

The outlier score total value extraction unit 47 extracts the outlier score total value for a term included in a designated period, from the outlier score total value storage unit 46 (step S44). Even in a case where the outlier score total value for seven months or more is stored in the outlier score total value storage unit 46, the outlier score total value extraction unit 47 extracts the outlier score total value for latest six months from the outlier score total value storage unit 46 when the designated period is the latest six months. The designated period may be past ∞ days, or a period with a start date designated. In addition, the designated period may be set by default or may be set by the user 4 via the setting unit 17.

Figure 13:
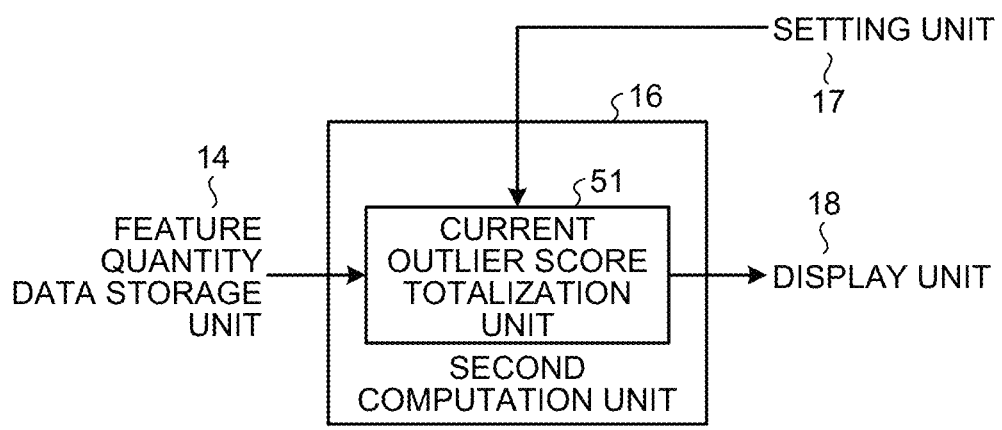
FIG. 13 is a diagram illustrating an exemplary configuration of a second computation unit of the device analysis apparatus according to the third embodiment.
Figure 14:
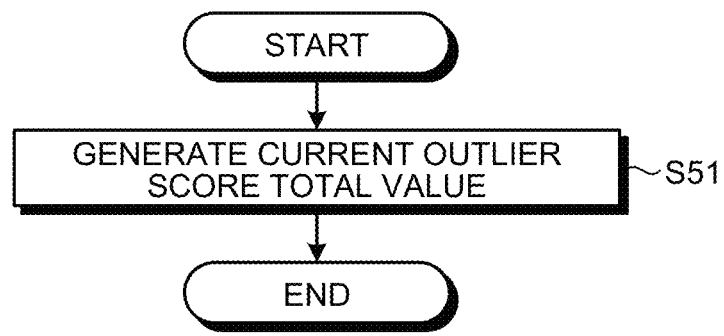
FIG. 14 is a flowchart illustrating an operation of the second computation unit of the device analysis apparatus according to the third embodiment.

Next, a detailed configuration and operation of the second computation unit 16 will be described. FIG. 13 is a diagram illustrating an exemplary configuration of the second computation unit 16 of the device analysis apparatus 1 according to the third embodiment. The second computation unit 16 includes a current outlier score totalization unit 51. FIG. 14 is a flowchart illustrating an operation of the second computation unit 16 of the device analysis apparatus 1 according to the third embodiment. The flowchart illustrated in FIG. 14 illustrates details of the operation in step S14 of the flowchart of the first embodiment illustrated in FIG. 2.

The current outlier score totalization unit 51 generate, as the second data, a current outlier score total value indicating behavior of the latest feature quantity data, by using one or more pieces of latest feature quantity data newer than feature quantity data used in generating the outlier score total value by the first computation unit 15 (step S51). The number of pieces of feature quantity data used by the current outlier score totalization unit 51 is less than the set term. As described above, the current outlier score totalization unit 51 generates the current outlier score total value by using the latest feature quantity data that is not used by the outlier score totalization unit 45 because the set term is not reached. A method of generating the current outlier score total value in the current outlier score totalization unit 51 is similar to the method of generating the outlier score total value in the outlier score totalization unit 45 described above.

Figure 15:
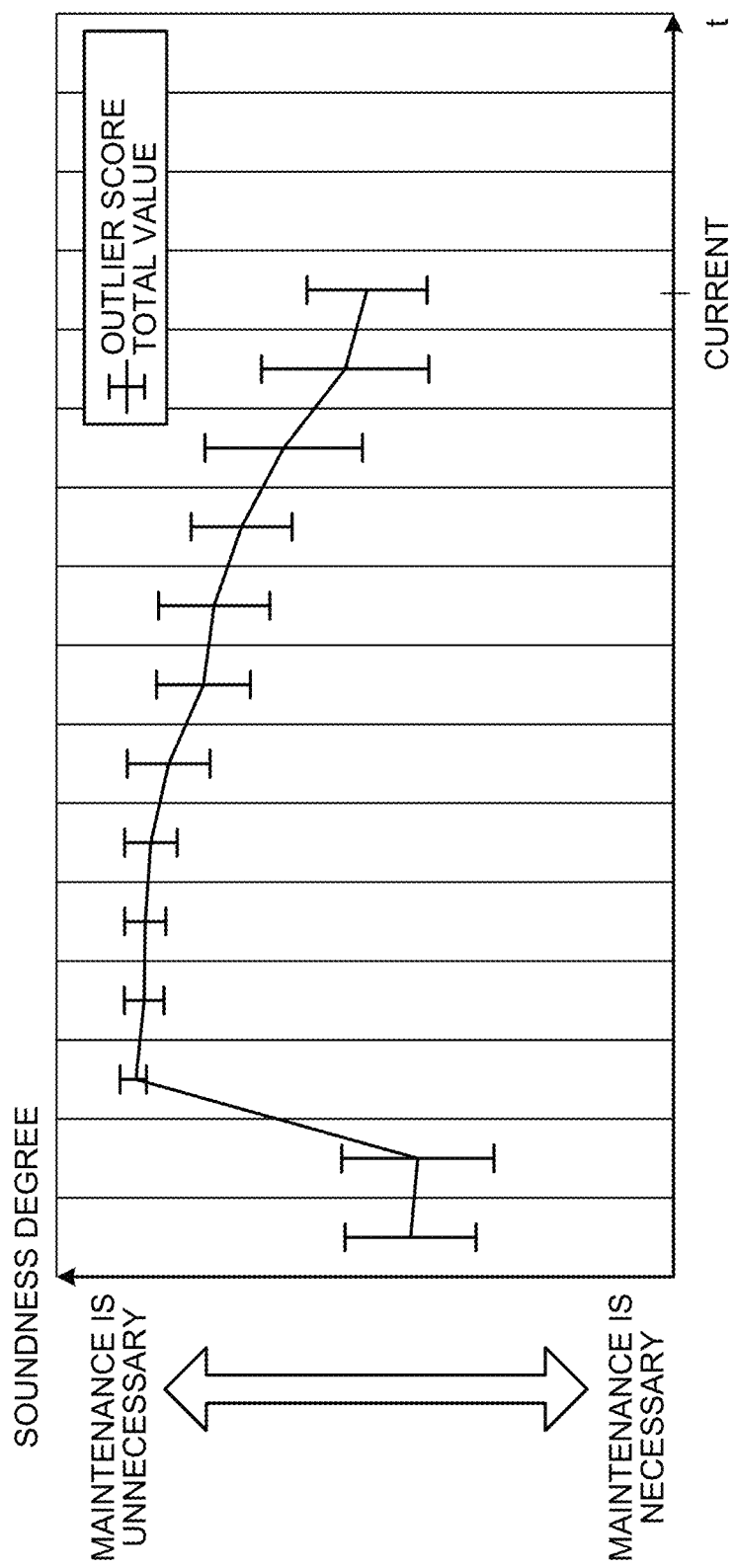
FIG. 15 is a graph illustrating an example of the outlier score total value and the current outlier score total value displayed by a display unit of the device analysis apparatus according to the third embodiment.

After the outlier score total value is generated by the first computation unit 15 and the current outlier score total value is generated by the second computation unit 16, the display unit 18 displays, in one graph, one or more of the outlier score total values extracted by the outlier score total value extraction unit 47 and the current outlier score total value generated by the current outlier score totalization unit 51. That is, the display unit 18 superimposes one or more of the outlier score total values and the current outlier score total value to be plotted on a graph. FIG. 15 is a graph illustrating an example of the outlier score total value and the current outlier score total value displayed by the display unit 18 of the device analysis apparatus 1 according to the third embodiment. In FIG. 15, a horizontal axis represents time, and a vertical axis represents a soundness degree of the device 3. Soundness is higher and maintenance is less necessary as the soundness degree is larger, and maintenance is more necessary as the soundness degree is smaller. Note that the first two of outlier score total values illustrated in FIG. 15 are outlier score total values corresponding to normal time, and a last part corresponding to "current" is the current outlier score total value. For example, the user 4 checks how much the outlier score total value displayed on the display unit 18 deviates from the normal time as a reference, a progress status of an outlier degree, that is, how a change rate changes, and the like. As a result, the user 4 can grasp what kind of state the latest state of a certain device 3 is.

In the third embodiment, the device analysis apparatus 1 periodically executes the operations up to the outlier score totalization unit 45 offline, and executes the operations in and after the outlier score total value extraction unit 47 and the current outlier score totalization unit 51 online by an operation from the user 4.

As described above, according to the present embodiment, the device analysis apparatus 1 generates feature quantity data by using operation data of the device 3 installed on the railway vehicle 2, generates an outlier score total value as first data indicating a past state of the device 3 and a current outlier score total value as second data indicating a current state of the device 3 from the feature quantity data, and superimposes and displays the outlier score total value and the current outlier score total value in one graph. In this case, similarly to the first embodiment, the device analysis apparatus 1 can perform visualization to allow data to be easily compared, while preventing an increase in processing load in visualizing a state of the device 3. The user 4 who has checked the display of the device analysis apparatus 1 can easily determine whether or not a change has occurred in the state of the device 3.

Fourth Embodiment

While the device analysis apparatus 1 generates and displays band line information in the second embodiment and the device analysis apparatus 1 generates and displays an outlier score total value in the third embodiment, it is also possible to generate and display both the band line information and the outlier score total value.

Figure 16:
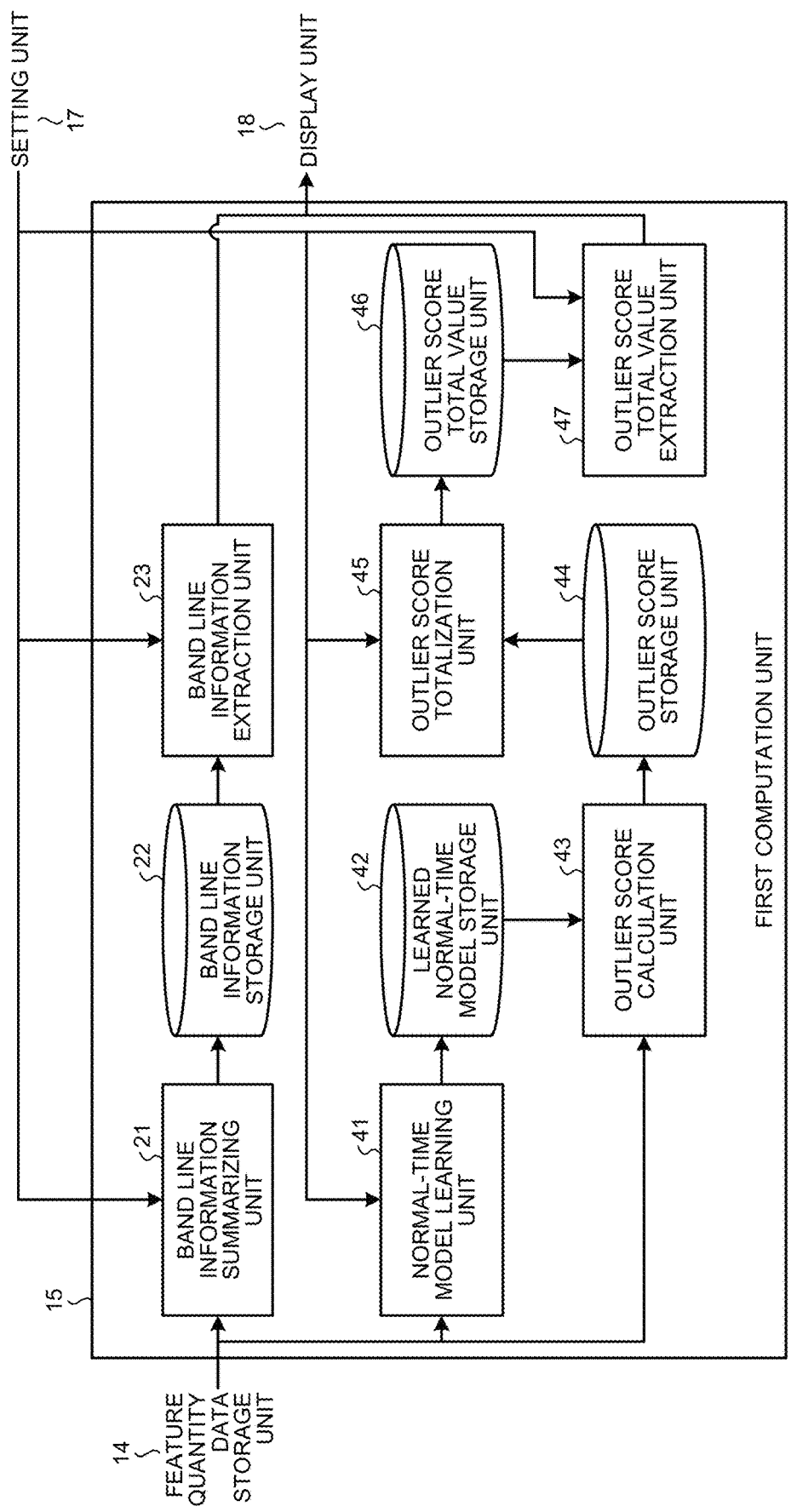
FIG. 16 is a diagram illustrating an exemplary configuration of a first computation unit of a device analysis apparatus according to a fourth embodiment.
Figure 17:
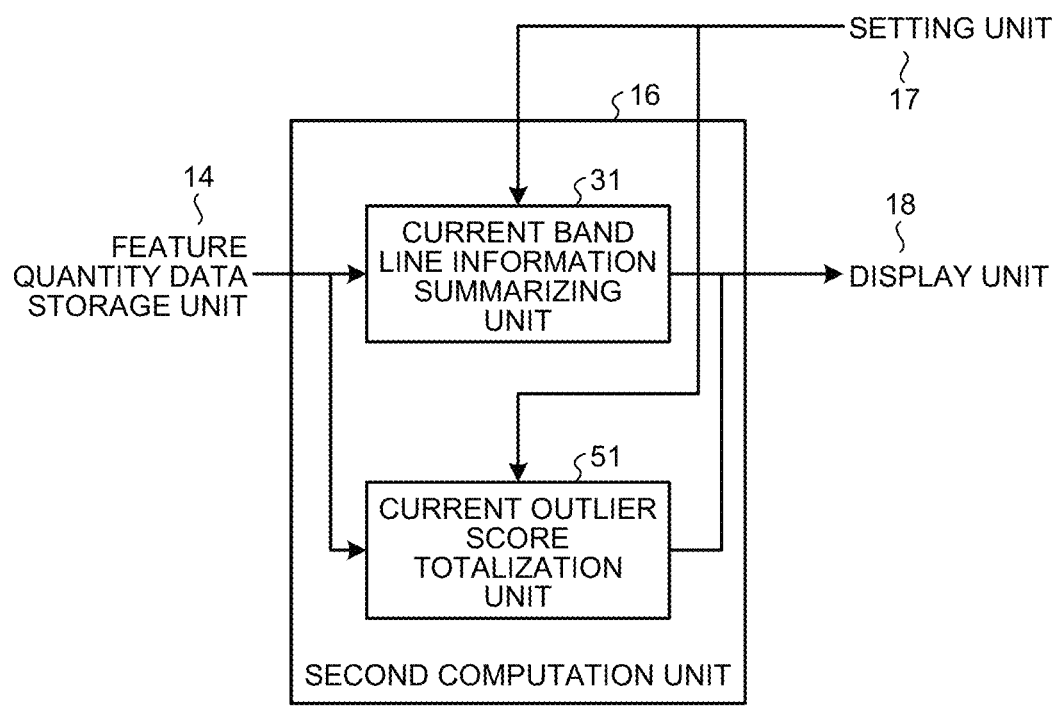
FIG. 17 is a diagram illustrating an exemplary configuration of the second computation unit of the device analysis apparatus according to the fourth embodiment.

FIG. 16 is a diagram illustrating an exemplary configuration of the first computation unit 15 of the device analysis apparatus 1 according to a fourth embodiment. In the fourth embodiment, the first computation unit 15 includes all the configurations illustrated in FIGS. 5 and 11. An operation of each configuration is as described above. FIG. 17 is a diagram illustrating an exemplary configuration of the second computation unit 16 of the device analysis apparatus 1 according to the fourth embodiment. In the fourth embodiment, the second computation unit 16 includes all the configurations illustrated in FIGS. 8 and 13. An operation of each configuration is as described above.

The display unit 18 displays, in one graph, one or more pieces of the band line information extracted by the band line information extraction unit 23 and the current band line information generated by the current band line information summarizing unit 31. In addition, the display unit 18 displays, in one graph, one or more outlier of the score total values extracted by the outlier score total value extraction unit 47 and a current outlier score total value generated by the current outlier score totalization unit 51. As a result, the user 4 can grasp what kind of state the latest state of a certain device 3 is. Furthermore, in a case where the display unit 18 can receive an operation from the user 4, the user 4 can check a state of the device 3 by appropriately selecting a display content.

As described above, according to the present embodiment, the device analysis apparatus 1 generates feature quantity data by using operation data of the device 3 installed on the railway vehicle 2, generates band line information and an outlier score total value as first data indicating a past state of the device 3 and current band line information and a current outlier score total value as second data indicating a current state of the device 3 from the feature quantity data, superimposes and displays the band line information and the current band line information in one graph, and superimposes and displays the outlier score total value and the current outlier score total value in one graph. In this case, similarly to the first embodiment, the device analysis apparatus 1 can perform visualization to allow data to be easily compared, while preventing an increase in processing load in visualizing a state of the device 3. The user 4 who has checked the display of the device analysis apparatus 1 can easily determine whether or not a change has occurred in the state of the device 3.

The configuration illustrated in the above embodiments illustrates one example and can be combined with another known technique, and it is also possible to combine embodiments with each other and omit and change a part of the configuration without departing from the subject matter of the present disclosure.

REFERENCE SIGNS LIST

1 device analysis apparatus; 2 railway vehicle; 3 device; 4 user; 11 operation data acquisition unit; 12 operation data storage unit; 13 feature quantity data generation unit; 14 feature quantity data storage unit; 15 first computation unit; 16 second computation unit; 17 setting unit; 18 display unit; 21 band line information summarizing unit; 22 band line information storage unit; 23 band line information extraction unit; 31 current band line information summarizing unit; 41 normal-time model learning unit; 42 learned normal-time model storage unit; 43 outlier score calculation unit; 44 outlier score storage unit; 45 outlier score totalization unit; 46 outlier score total value storage unit; 47 outlier score total value extraction unit; 51 current outlier score totalization unit.

The invention claimed is:

1. A device analysis apparatus comprising:
an operation data memory to store operation data indicating an operation state of a device;
feature quantity data generation circuitry to generate feature quantity data of the device by using the operation data;
a feature quantity data memory to store the feature quantity data;
first computation circuitry to generate first data indicating behavior of the feature quantity data in units of a term that is set, by using the feature quantity data stored in the feature quantity data storage memory;
second computation circuitry to generate second data indicating behavior of latest feature quantity data by using one or more pieces of the latest feature quantity data newer than the feature quantity data used in generating the first data by the first computation circuitry, among the feature quantity data stored in the feature quantity data memory; and
a display to display one or more pieces of the first data and the second data in one graph.

2. The device analysis apparatus according to claim 1, wherein
the first computation circuitry includes:
band line information summarizing circuitry to generate, as the first data, band line information obtained by summarizing the feature quantity data in units of the term, by using the feature quantity data stored in the feature quantity data memory;
a band line information memory to store the band line information; and
band line information extraction-sex circuitry to extract the band line information for a term included in a designated period, from the band line information memory,
the second computation circuitry includes:
current band line information summarizing circuitry to generate, as the second data, current band line information obtained by summarizing latest feature quantity data, by using one or more pieces of the latest feature quantity data newer than the feature quantity data used in generating the band line information by the first computation unit circuitry, and
the display displays, in one graph, one or more pieces of the band line information extracted by the band line information extraction circuitry and the current band line information generated by the current band line information summarizing circuitry.

3. The device analysis apparatus according to claim 2, wherein
the band line information summarizing circuitry generates the band line information including a plurality of display patterns, based on a quantile obtained from the number of pieces of the feature quantity data included in the band line information generated in units of the term.

4. The device analysis apparatus according to claim 1, wherein
the first computation circuitry includes:
normal-time model learning circuitry to learn a normal-time model representing a state of the device in a normal time by using the feature quantity data in a defined period as the feature quantity data in a normal time of the device, among the feature quantity data stored in the feature quantity memory;
a learned normal-time model memory to store the learned normal-time model learned by the normal-time model learning circuitry;
outlier score calculation circuitry to use the learned normal-time model stored in the learned normal-time model memory to calculate an outlier score indicating a degree of deviation from a state of the device in a normal time with respect to the feature quantity data stored in the feature quantity data memory;
an outlier score memory to store the outlier score;
outlier score totalization circuitry to totalize the outlier score stored in the outlier score memory in units of a term included in a designated period and to generate an outlier score total value;
an outlier score total value memory to store the outlier score total value; and
outlier score total value extraction circuitry to extract the outlier score total value for a term included in a designated period, from the outlier score total value memory,
the second computation circuitry includes:
current outlier score totalization circuitry to generate, as the second data, a current outlier score total value indicating behavior of latest feature quantity data, by using one or more pieces of the latest feature quantity data newer than the feature quantity data used in generating the outlier score total value by the first computation circuitry, and the display displays, in one graph, one or more of the outlier score total values extracted by the outlier score total value extraction circuitry and the current outlier score total value generated by the current outlier score totalization circuitry.

5. The device analysis apparatus according to claim 1, wherein
the first computation circuitry generates the first data for the specific device installed on a railway vehicle, and
the second computation circuitry generates the second data for the specific device installed on the railway vehicle.

6. The device analysis apparatus according to claim 1, wherein
the first computation circuitry generates the first data for a plurality of the devices of an identical type installed on a specific railway vehicle, and
the second computation circuitry generates the second data for a plurality of the devices of an identical type installed on the specific railway vehicle.

7. The device analysis apparatus according to claim 1, wherein
the first computation circuitry generates the first data for a plurality of the devices of an identical type installed on railway vehicles that are different, and
the second computation circuitry generates the second data for a plurality of the devices of an identical type installed on the railway vehicles that are different.

8. The device analysis apparatus according to claim 1, comprising:
setting circuitry to receive an operation from a user and set the term.

9. A device analysis method comprising:
generating feature quantity data of a device by using operation data, and causing a feature quantity data memory to store the feature quantity data, by a feature quantity data generation circuitry, the operation data being stored in an operation data memory and indicating an operation state of the device;
generating first data indicating behavior of the feature quantity data in units of a term that is set, by using the feature quantity data stored in the feature quantity data memory, by first computation circuitry;
generating second data indicating behavior of latest feature quantity data by using one or more pieces of the latest feature quantity data newer than the feature quantity data used in generating the first data by the first computation circuitry, among the feature quantity data stored in the feature quantity data memory, by second computation circuitry; and
displaying one or more pieces of the first data and the second data in one graph, by a display.

10. The device analysis method according to claim 9, wherein
the first computation circuitry includes band line information summarizing circuitry, a band line information memory, and band line information extraction circuitry,
the generating the first data includes:
a band line information generating step, by the band line information summarizing circuitry, of generating, as the first data, band line information obtained by summarizing the feature quantity data in units of the term, by using the feature quantity data stored in the feature quantity data memory, and causing the band line information memory to store the band line information; and
a per-past-term band line information extraction, by the band line information extraction circuitry, of extracting the band line information for a term included in a designated period, from the band line information memory,
the second computation circuitry includes current band line information summarizing circuitry,
the generating the second data includes:
a current-band-line information summarizing, by the current band line information summarizing circuitry, of generating, as the second data, current band line information obtained by summarizing latest feature quantity data, by using one or more pieces of the latest feature quantity data newer than the feature quantity data used in generating the band line information by the first computation circuitry, and
in the displaying, the display displays, in one graph, one or more pieces of the band line information extracted by the band line information extraction circuitry and the current band line information generated by the current band line information summarizing circuitry.

11. The device analysis method according to claim 10, wherein
in the band line information generating, the band line information summarizing circuitry generates the band line information including a plurality of display patterns, based on a quantile obtained from the number of pieces of the feature quantity data included in the band line information generated in units of the term.

12. The device analysis method according to claim 9, wherein
the first computation circuitry includes normal-time model learning circuitry, a learned normal-time model memory, outlier score calculation circuitry, an outlier score memory, outlier score totalization circuitry, an outlier score total value memory, and outlier score total value extraction circuitry,
the generating the first data includes:
a normal-time model learning, by the normal-time model learning circuitry, of learning a normal-time model representing a state of the device in a normal time by using the feature quantity data in a defined period as the feature quantity data in a normal time of the device among the feature quantity data stored in the feature quantity data memory, and causing the learned normal-time model memory to store the learned normal-time model;
an outlier score calculation step, by the outlier score calculation circuitry, of calculating an outlier score indicating a degree of deviation from a state of the device in a normal time with respect to the feature quantity data stored in the feature quantity data memory, by using the learned normal-time model stored in the learned normal-time model memory, and causing the outlier score memory to store the outlier score;
an outlier score totalization, by the outlier score totalization circuitry, of totalizing the outlier score stored in the outlier score memory in units of a term included in a designated period to generate an outlier score total value, and causing the outlier score total value memory to store the outlier score total value; and
a per-past-term outlier score total value extraction, by the outlier score total value extraction circuitry, of extracting, from the outlier score total value memory, the outlier score total value for a term included in a designated period,
the second computation circuitry includes current outlier score totalization circuitry, the generating the second data includes:

a current outlier score totalization, by the current outlier score totalization circuitry, of generating, as the second data, a current outlier score total value indicating behavior of latest feature quantity data, by using one or more pieces of the latest feature quantity data newer than the feature quantity data used in generating the outlier score total value by the first computation circuitry, and in the displaying, the display displays, in one graph, one or more of the outlier score total values extracted by the outlier score total value extraction circuitry and the current outlier score total value generated by the current outlier score totalization circuitry.

13. The device analysis method according to claim 9, wherein in the generating the first data, the first computation circuitry generates the first data for the specific device installed on a railway vehicle, and in the generating the second data, the second computation circuitry generates the second data for the specific device installed on the railway vehicle.

14. The device analysis method according to claim 9, wherein in the generating the first data, the first computation circuitry generates the first data for a plurality of the devices of an identical type installed on a specific railway vehicle, and in the generating the second data, the second computation-circuitry generates the second data for a plurality of the devices of an identical type installed on the specific railway vehicle.

15. The device analysis method according to claim 9, wherein in the generating the first data, the first computation circuitry generates the first data for a plurality of the devices of an identical type installed on railway vehicles that are different, and in the generating the second data, the second computation circuitry generates the second data for a plurality of the devices of an identical type installed on the railway vehicles that are different.

16. The device analysis method according to claim 9, comprising:

receiving an operation from a user and setting the term by setting circuitry.

17. A non-transitory storage medium storing a device analysis program for causing a computer to execute the device analysis method according to claim 9.

* * * * *